United States Patent
Henry et al.

(10) Patent No.: US 7,159,098 B2
(45) Date of Patent: *Jan. 2, 2007

(54) SELECTING NEXT INSTRUCTION LINE BUFFER STAGE BASED ON CURRENT INSTRUCTION LINE BOUNDARY WRAPAROUND AND BRANCH TARGET IN BUFFER INDICATOR

(75) Inventors: G. Glenn Henry, Austin, TX (US); Thomas C. McDonald, Austin, TX (US)

(73) Assignee: IP-First, LLC., Fremont, CA (US)

( * ) Notice: Subject to any disclaimer, the term of this patent is extended or adjusted under 35 U.S.C. 154(b) by 182 days.

This patent is subject to a terminal disclaimer.

(21) Appl. No.: 10/920,120

(22) Filed: Aug. 17, 2004

(65) Prior Publication Data

US 2005/0044343 A1 Feb. 24, 2005

Related U.S. Application Data

(63) Continuation of application No. 09/898,832, filed on Jul. 3, 2001, now Pat. No. 6,823,444.

(51) Int. Cl.
*G06F 9/38* (2006.01)

(52) U.S. Cl. ............... 712/207; 712/205; 712/214; 712/233; 712/239

(58) Field of Classification Search ............... None
See application file for complete search history.

(56) References Cited

U.S. PATENT DOCUMENTS

| | | | |
|---|---|---|---|
| 4,181,942 A | 1/1980 | Forster et al. |
| 4,200,927 A | 4/1980 | Hughes et al. |
| 4,860,197 A | 8/1989 | Langendorf et al. |
| 5,142,634 A | 8/1992 | Fite et al. |
| 5,163,140 A | 11/1992 | Stiles et al. |
| 5,313,634 A | 5/1994 | Eickemeyer |
| 5,353,421 A | 10/1994 | Emma et al. |
| 5,355,459 A | 10/1994 | Matsuo et al. |
| 5,394,530 A | 2/1995 | Kitta |
| 5,404,467 A | 4/1995 | Saba et al. |
| 5,434,985 A | 7/1995 | Emma et al. |
| 5,513,330 A | 4/1996 | Stiles |

(Continued)

OTHER PUBLICATIONS

Yeh et al. *Alternative Implementation of Two-Level Adaptive Branch Prediction.* 19th Annual International Symposium on Computer Architecture. pp. 124-134. May 19-21, 1992. Gold Coast, Australia.

(Continued)

*Primary Examiner*—Kenneth S. Kim
(74) *Attorney, Agent, or Firm*—E. Alan Davis; James W. Huffman

(57) ABSTRACT

A branch control apparatus in a microprocessor. The branch control apparatus includes an instruction buffer having a plurality of stages that buffer cache lines of instruction bytes received from an instruction cache. A multiplexer selects one of the bottom three stages in the instruction buffer to provide to instruction format logic. The multiplexer selects a stage based on a branch indicator, an instruction wrap indicator, and a carry indicator. The branch indicator indicates whether the processor previously branched to a target address provided by a branch target address cache. The branch indicator and target address are previously stored in association with the stage containing the branch instruction for which the target address is cached. The wrap indicator indicates whether the currently formatted instruction wraps across two cache lines. The carry indicator indicates whether the current instruction being formatted occupies the last byte of the currently formatted instruction buffer stage.

41 Claims, 9 Drawing Sheets

U.S. PATENT DOCUMENTS

| | | | |
|---|---|---|---|
| 5,530,825 A | 6/1996 | Black et al. |
| 5,553,246 A | 9/1996 | Suzuki |
| 5,604,877 A | 2/1997 | Hoyt et al. |
| 5,623,614 A | 4/1997 | Van Dyke et al. |
| 5,623,615 A | 4/1997 | Salem et al. |
| 5,634,103 A | 5/1997 | Dietz et al. |
| 5,687,349 A | 11/1997 | McGarity |
| 5,687,360 A | 11/1997 | Chang |
| 5,706,491 A | 1/1998 | McMahan |
| 5,721,855 A | 2/1998 | Hinton et al. |
| 5,734,881 A | 3/1998 | White et al. |
| 5,752,069 A | 5/1998 | Roberts et al. |
| 5,761,723 A | 6/1998 | Black et al. |
| 5,768,576 A | 6/1998 | Hoyt et al. |
| 5,805,877 A | 9/1998 | Black et al. |
| 5,812,839 A | 9/1998 | Hoyt et al. |
| 5,828,901 A | 10/1998 | O'Toole et al. |
| 5,832,289 A | 11/1998 | Shaw et al. |
| 5,850,532 A | 12/1998 | Narayan et al. |
| 5,850,543 A | 12/1998 | Shiell et al. |
| 5,864,707 A | 1/1999 | Tran et al. |
| 5,867,701 A | 2/1999 | Brown et al. |
| 5,881,260 A | 3/1999 | Raje et al. |
| 5,881,265 A | 3/1999 | McFarland et al. |
| 5,931,944 A | 8/1999 | Ginosar et al. |
| 5,948,100 A | 9/1999 | Hsu et al. |
| 5,961,629 A | 10/1999 | Nguyen et al. |
| 5,964,868 A | 10/1999 | Gochman et al. |
| 5,968,169 A | 10/1999 | Pickett |
| 5,974,543 A | 10/1999 | Hilgendorf et al. |
| 5,978,909 A | 11/1999 | Lempel |
| 6,035,391 A | 3/2000 | Isaman |
| 6,041,405 A | 3/2000 | Green |
| 6,044,459 A | 3/2000 | Bae et al. |
| 6,081,884 A | 6/2000 | Miller |
| 6,085,311 A | 7/2000 | Narayan et al. |
| 6,088,793 A | 7/2000 | Liu et al. |
| 6,101,595 A | 8/2000 | Pickett et al. |
| 6,108,773 A | 8/2000 | Col et al. |
| 6,122,729 A | 9/2000 | Tran |
| 6,134,654 A | 10/2000 | Patel et al. |
| 6,151,671 A | 11/2000 | D'Sa et al. |
| 6,157,988 A | 12/2000 | Dowling |
| 6,170,054 B1 | 1/2001 | Poplingher |
| 6,175,897 B1 | 1/2001 | Ryan et al. |
| 6,185,676 B1 | 2/2001 | Poplingher et al. |
| 6,233,676 B1 | 5/2001 | Henry et al. |
| 6,250,821 B1 | 6/2001 | Schwendinger |
| 6,256,727 B1 | 7/2001 | McDonald |
| 6,260,138 B1 | 7/2001 | Harris |
| 6,279,105 B1 | 8/2001 | Konigsburg et al. |
| 6,279,106 B1 | 8/2001 | Roberts |
| 6,308,259 B1 | 10/2001 | Witt |
| 6,314,514 B1 | 11/2001 | McDonald |
| 6,321,321 B1 | 11/2001 | Johnson |
| 6,351,796 B1 | 2/2002 | McCormick et al. |
| 6,374,350 B1 | 4/2002 | D'Sa et al. |
| 6,457,120 B1 | 9/2002 | Sinharoy |
| 6,502,185 B1 | 12/2002 | Keller et al. |
| 6,560,696 B1 | 5/2003 | Hummel et al. |
| 6,601,161 B1 | 7/2003 | Rappoport et al. |
| 6,647,467 B1 | 11/2003 | Dowling |
| 6,725,357 B1 | 4/2004 | Cousin |
| 6,748,441 B1 | 6/2004 | Gemmell |
| 6,754,808 B1 | 6/2004 | Roth et al. |
| 6,823,444 B1 | 11/2004 | Henry et al. |
| 6,886,093 B1 | 4/2005 | Henry et al. |
| 6,895,498 B1 | 5/2005 | McDonald et al. |
| 6,898,699 B1 | 5/2005 | Jourdan et al. |
| 6,968,444 B1 | 11/2005 | Kroesche et al. |
| 2002/0188833 A1 | 12/2002 | Henry et al. |
| 2002/0194460 A1 | 12/2002 | Henry et al. |
| 2002/0194461 A1 | 12/2002 | Henry et al. |
| 2002/0194464 A1 | 12/2002 | Henry et al. |
| 2004/0030866 A1 | 2/2004 | McDonald |
| 2004/0139281 A1 | 7/2004 | McDonald |
| 2004/0139292 A1 | 7/2004 | McDonald |
| 2004/0139301 A1 | 7/2004 | McDonald |
| 2004/0143709 A1 | 7/2004 | McDonald |
| 2004/0143727 A1 | 7/2004 | McDonald |
| 2005/0044343 A1 | 2/2005 | Henry et al. |
| 2005/0076193 A1 | 4/2005 | Henry et al. |
| 2005/0114636 A1 | 5/2005 | McDonald et al. |
| 2005/0132175 A1 | 6/2005 | Henry et al. |
| 2005/0198479 A1 | 9/2005 | Bean et al. |

OTHER PUBLICATIONS

Chang et al. *Alternative Implementations of Hybrid Branch Predictors*. Proceedings of MICRO-28. 1995. IEEE.

Mc Farling, Scott. *WRL Technical Note TN-36*. Combining Branch Predictors. Jun. 1993. Western Research Laboratory, 250 University Ave., Palo Alto, CA 94301.

Bray et al. *Strategies For Branch Target Buffers*. Technical Report No. CSL-TR-91-480. Jun. 1991.

Sakamoto et al. *Microarchitecture Support for Reducing Branch Penalty in a Superscaler Processor*. pp. 208-216. Mittsubishi Electric Corp. 4-1 Mizuhara, Itami, Hyogo 664. Japan, 1996. IEEE.

IEEE 100, The Authoritative Dictionary of IEEE Standard Terms, Seventh Edition, The Institute of Electrical Engineering, Inc. 3 Park Avenue, New York, NY, 10016-5997, Copyright 2000, Published by Standards Information Network IEEE Press, Published Dec. 2000, USA, p. 135.

Microprocessor Report, vol. 9, No. 2, Feb. 16, 1995, p. 5.

Microprocessor Report, Aug. 23, 1999, p. 7.

Online Computing Dictionary. web site //instantweb.com/d/dictionary/foldoc.cgi?query=btb May 5, 1995. Branch Target Buffer.

The D Latch, Play-Hookey Web Page, Oct. 10, 1999.

Patterson et al. "Computer Organization & Design: The Hardware/Software Interface." Morgan Kaufmann Publishers, Inc. San Francisco, CA. 1998 p. 469.

Jimenez et al. "The Impact of Delay on the Design of Branch Predictors." 2000 IEEE, p. 1-10.

Eberly et al. "The Correlation Branch Target Address Cache" May 1996. IBM TDB, vol. 35,No. 5 p. 83-85.

Patterson et al. "Computer Organization & Design: The Hardware/Software Interface." Morgan Kaufmann Publishers, Inc. San Francisco, CA. 1998 p. 453-455.

IBM Technical Disclosure Bulletin NN9204269, "Return Address Stack Cache." Apr. 1992, pp. 269-271.

Instruction Buffer Stage Selection

Instruction Buffer Stage Selection Example: Case 1

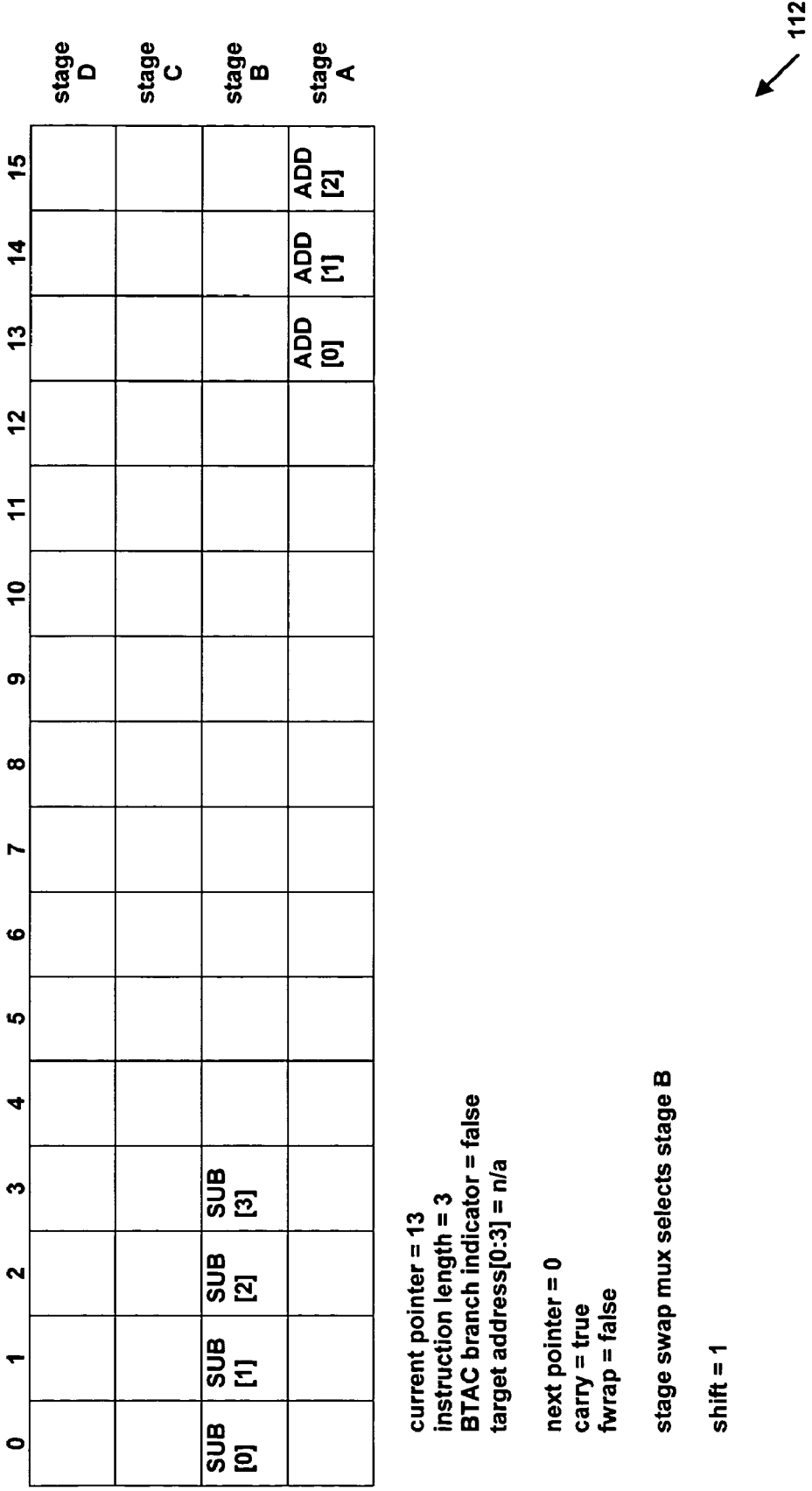

Instruction Buffer Stage Selection Example: Case 3

Instruction Buffer Stage Selection Example: Case 4

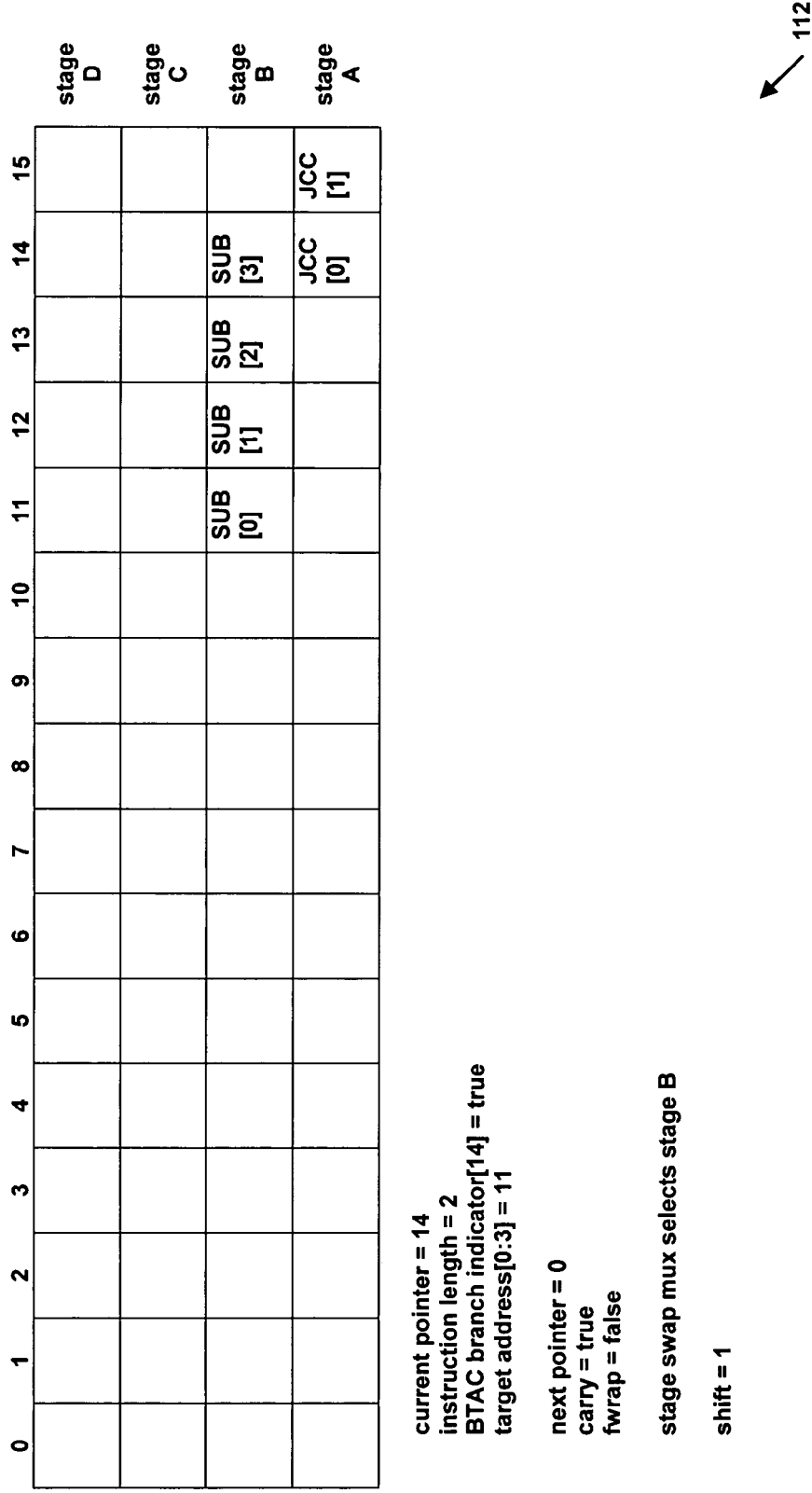

Figure 4F

| | 0 | 1 | 2 | 3 | 4 | 5 | 6 | 7 | 8 | 9 | 10 | 11 | 12 | 13 | 14 | 15 | |
|---|---|---|---|---|---|---|---|---|---|---|---|---|---|---|---|---|---|
| stage D | | | | | | | | | | | | | | | | | |
| stage C | | | | | | | | | | | | SUB[0] | SUB[1] | SUB[2] | SUB[3] | | |
| stage B | JCC[1] | | | | | | | | | | | | | | | | |
| stage A | | | | | | | | | | | | | | | | JCC[0] | | current pointer = 15
instruction length = 2
BTAC branch indicator[15] = true
target address[0:3] = 11 next pointer = 1
carry = true
fwrap = true stage swap mux selects stage C shift = 2

*Instruction Buffer Stage Selection Example: Case 6*

112

SELECTING NEXT INSTRUCTION LINE BUFFER STAGE BASED ON CURRENT INSTRUCTION LINE BOUNDARY WRAPAROUND AND BRANCH TARGET IN BUFFER INDICATOR

CROSS-REFERENCE TO RELATED APPLICATIONS

This application is a continuation of application Ser. No. 09/898,832, filed Jul. 3, 2001 now U.S. Pat. No. 6,823,444. This application is related to U.S. patent application Ser. No. 09/898,583 entitled APPARATUS AND METHOD FOR DENSELY PACKING A BRANCH INSTRUCTION PREDICTED BY A BRANCH TARGET ADDRESS CACHE AND ASSOCIATED TARGET INSTRUCTIONS INTO A BYTE-WIDE INSTRUCTION BUFFER, having a common filing date and a common assignee and which is hereby incorporated by reference in its entirety for all purposes.

| Docket # | Ser. No. | Title |
| --- | --- | --- |
| CNTR: 2020 | 09/898583 | APPARATUS AND METHOD FOR DENSELY PACKING A BRANCH INSTRUCTION PREDICTED BY A BRANCH TARGET ADDRESS CACHE AND ASSOCIATED TARGET INSTRUCTIONS INTO A BYTE-WIDE INSTRUCTION BUFFER |
| CNTR: 2051 | 09/906381 | APPARATUS AND METHOD FOR HANDLING BTAC BRANCHES THAT WRAP ACROSS INSTRUCTION CACHE LINES |

FIELD OF THE INVENTION

This invention relates in general to the field of branch target address caching in pipelined microprocessors, and more particularly to providing correct instruction bytes to instruction formatting logic after a microprocessor branch caused by a branch target address cache hit.

BACKGROUND OF THE INVENTION

Pipelined microprocessors include multiple pipeline stages, each stage performing a different function necessary in the execution of program instructions. Typical pipeline stage functions are instruction fetch, instruction decode, instruction execution, memory access, and result write-back.

The instruction fetch stage fetches the next instruction in the currently executing program. The next instruction is typically the instruction with the next sequential memory address. However, in the case of a taken branch instruction, the next instruction is the instruction at the memory address specified by the branch instruction, commonly referred to as the branch target address. The instruction fetch stage fetches instructions from an instruction cache. If the instructions are not present in t h e instruction cache, they are fetched into the instruction cache from another memory higher up in the memory hierarchy of the machine, such as from a higher-level cache or from system memory. The fetched instructions are provided to the instruction decode stage.

The instruction decode stage includes instruction decode logic that decodes the instruction bytes received from the instruction fetch stage. In the case of a processor that supports variable length instructions, such as an x86 architecture processor, one function of the instruction decode stage is to format a stream of instruction bytes into separate instructions. Formatting a stream of instructions includes determining the length of each instruction. That is, instruction format logic receives a stream of undifferentiated instruction bytes from the instruction fetch stage and formats, or parses, the stream of instruction bytes into individual groups of bytes. Each group of bytes is an instruction, and the instructions make up the program being executed by the processor. The instruction decode stage may also include translating macro-instructions, such as x86 instructions, into micro-instructions that are executable by the remainder of the pipeline.

The execution stage includes execution logic that executes the formatted and decoded instructions received from the instruction decode stage. The execution logic operates on data retrieved from a register set of the processor and/or from memory. The write-back stage stores the results produced by the execution logic into the processor register set.

An important aspect of pipelined processor performance is keeping each stage of the processor busy performing the function it was designed to perform. In particular, if the instruction fetch stage does not provide instruction bytes when the instruction decode stage is ready to decode the next instruction, then processor performance will suffer. In order to prevent starvation of the instruction decode stage, an instruction buffer is commonly placed between the instruction cache and instruction format logic. The instruction fetch stage attempts to keep several instructions worth of instruction bytes in the instruction buffer so that the instruction decode stage will have instruction bytes to decode, rather than starving.

Typically, an instruction cache provides a cache line of instruction bytes, typically 16 or 32 bytes, at a time. The instruction fetch stage fetches one or more cache lines of instruction bytes from the instruction cache and stores the cache lines into the instruction buffer. When the instruction decode stage is ready to decode an instruction, it accesses the instruction bytes in the instruction buffer, rather than having to wait on the instruction cache.

The instruction cache provides a cache line of instruction bytes selected by a fetch address supplied to the instruction cache by the instruction fetch stage. During normal program operation, the fetch address is simply incremented by the size of a cache line since it is anticipated that program instructions are executed sequentially. The incremented fetch address is referred to as the next sequential fetch address. However, if a branch instruction is decoded by the instruction decode logic and the branch instruction is taken (or predicted taken), then the fetch address is updated to the target address of the branch instruction (modulo the cache line size), rather than being updated to the next sequential fetch address.

However, by the time the fetch address is updated to the branch target address, the instruction buffer has likely been populated with instruction bytes of the next sequential instructions after the branch instruction. Because a branch has occurred, the instructions after the branch instruction must not be decoded and executed. That is, proper program execution requires the instructions at the branch target address to be executed, not the next sequential instructions after the branch instruction. The instruction bytes in the instruction buffer were erroneously pre-fetched in anticipation of the more typical case of sequential instruction flow in the program. To remedy this error, the processor must flush all instruction bytes behind the branch instruction, which includes the instruction bytes in the instruction buffer.

Flushing the instruction buffer upon a taken branch instruction is costly since now the instruction decode stage will be starved until the instruction buffer is re-populated from the instruction cache. One solution to this problem is to branch prior to decoding the branch instruction. This may be accomplished by employing a branch target address cache (BTAC) that caches fetch addresses of instruction cache lines containing previously executed branch instructions and their associated target addresses.

The instruction cache fetch address is applied to the BTAC essentially in parallel with the application of the fetch address to the instruction cache. In the case of an instruction cache fetch address of a cache line containing a branch instruction, the cache line is provided to the instruction buffer. In addition, if the fetch address hits in the BTAC, the BTAC provides an associated branch target address. If the branch instruction hitting in the BTAC is predicted taken, the instruction cache fetch address is updated to the target address provided by the BTAC.

Because the instruction cache provides a cache line of instructions at a time to the instruction buffer, there may be instruction bytes after the branch instruction in the cache line. The instruction bytes after the branch instruction should not be executed. However, the instruction buffer cannot be flushed wholesale (as was done with processors without the BTAC described above) since there may be valid instructions still present in the instruction buffer that have not yet been decoded. In particular, the branch instruction itself (and any other instruction bytes in the cache line prior to the branch instruction) needs to be decoded and executed.

However, while the branch instruction remains in the instruction buffer and has not yet been formatted, the location of the instructions following the branch instruction in the instruction buffer is not known. This is because the branch instruction's length and location in the cache line are not known until it is formatted; and consequently, the location of the branch instruction in the instruction buffer is not known. Accordingly, the location of the instruction following the branch instruction is also not known.

Furthermore, it may be that before the branch instruction is decoded, a cache line containing the target instructions of the branch may be stored into the instruction buffer. The instruction bytes preceding the target instructions in the cache line must not be executed. To further complicate matters, since a branch instruction may be composed of multiple bytes, the branch instruction may span multiple cache lines.

Typically, it is a difficult task in the design of a pipelined microprocessor to design instruction format logic capable of performing instruction format functions within the cycle time of the processor. Hence, it is advantageous to provide as much of the cycle time for formatting instruction bytes as possible, rather than shifting instruction bytes out of the instruction buffer. Consequently, it is advantageous to employ an instruction buffer that provides as much time as possible for the instruction format logic to format the instruction bytes provided by the instruction buffer. In addition, it is advantageous to employ a large instruction buffer in the microprocessor to reduce the likelihood of instruction decode stage starvation. This is particularly important as the rate increases at which microprocessor pipelines are able to process instructions. This is particularly true as the rate increases relative to the memory access time, or relative to the time required for the fetch stage to fetch instructions from the instruction cache in the case of a taken branch.

Therefore, what is needed is a branch control apparatus in a pipelined processor that enables use of an instruction cache fetch address-based BTAC in conjunction with a large instruction buffer that provides beneficial processor timing characteristics and proper program execution.

SUMMARY

The present invention provides a branch control apparatus in a pipelined processor that enables use of a pre-decode BTAC in conjunction with a multiple-byte wide, multiple stage instruction buffer that provides instruction decode logic increased time for formatting instructions. Accordingly, in attainment of the aforementioned object, it is a feature of the present invention to provide a microprocessor. The microprocessor includes an instruction buffer having a plurality of stages for buffering instruction bytes received from an instruction cache. The microprocessor also includes a branch indicator associated with each of the plurality of stages that stores an indication of whether or not the microprocessor branched to a target address of a branch instruction buffered in the associated stage. The microprocessor also includes a multiplexer, coupled to the instruction buffer, which selects one of the plurality of stages based on the branch indicator associated with one of the plurality of stages.

In another aspect, it is a feature of the present invention to provide a pre-decode stage in a microprocessor. The pre-decode stage includes an instruction buffer having at least stages A, B, and C, for buffering instruction bytes. The pre-decode stage also includes a multiplexer, coupled to the instruction buffer, that selects one of the stages A, B, and C for provision to instruction format logic. The pre-decode stage also includes a branch indicator, coupled to the multiplexer, that indicates whether the microprocessor branched based on a branch instruction present in the stage A. The pre-decode stage also includes a wrap indicator, coupled to the multiplexer, that indicates whether an instruction formatted by the instruction format logic wraps across the stages A and B. The multiplexer selects one of the stages A, B, and C for provision to the instruction format logic based on the branch indicator and the wrap indicator.

In another aspect, it is a feature of the present invention to provide a microprocessor branch control apparatus. The branch control apparatus includes an instruction buffer, having first, second, and third stages for buffering first, second, and third cache lines received from an instruction cache. The first and second cache lines each contain a portion of a branch instruction. The third cache line contains a target instruction of the branch instruction. The branch control apparatus also includes a branch target address cache (BTAC), coupled to the instruction buffer, that outputs an indication that the third cache line was selected from the instruction cache by a target address of the branch instruction provided by the BTAC. The branch control apparatus also includes a multiplexer, coupled between the instruction buffer and instruction format logic, that selects one of the first, second, and third stages for provision to the instruction format logic. The multiplexer selects the third stage, after selecting the first and second stages, based on the indication output by the BTAC and based on a length of the branch instruction determined by the instruction format logic.

In another aspect, it is a feature of the present invention to provide a method for buffering instruction bytes for provision to instruction format logic in a microprocessor. The method includes storing an indication of whether or not the processor branched in response to a first cache line stored in an instruction buffer, generating a length of a first instruction in the first cache line, and determining whether the first instruction wraps beyond the first cache line based on the length of the first instruction. The method also includes selecting a second cache line stored in the instruction buffer for formatting a second instruction, based on the indication and the determining.

An advantage of the present invention is that it enables use of a multiple-byte wide instruction buffer in conjunction with a pre-decode BTAC to achieve zero penalty branches in most cases. Instead of shifting out already formatted stages of the instruction buffer and then providing the bottom stage to instruction format logic, the present invention performs the shift after the providing of the stage. By decoupling the shifting from the providing, the present invention advantageously potentially increases the amount of cycle time available to the instruction format logic to format the current instruction.

Other features and advantages of the present invention will become apparent upon study of the remaining portions of the specification and drawings.

BRIEF DESCRIPTION OF THE DRAWINGS

FIGS. 4A–F are tables illustrating examples of selection of the instruction buffer stages of FIG. 1 according to the flowchart of FIG. 3 according to the present invention.

DETAILED DESCRIPTION

Figure 1:
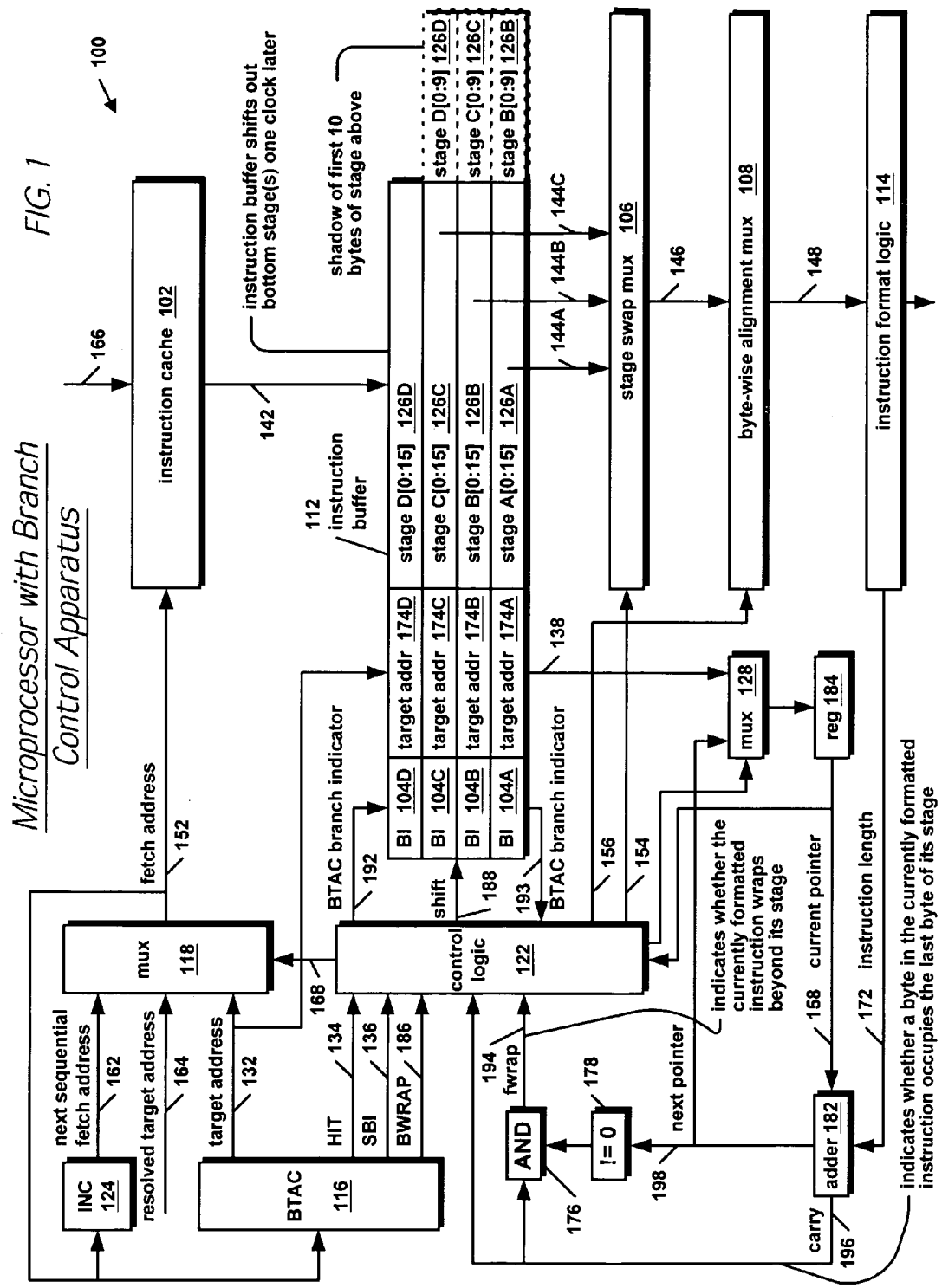
FIG. 1 is a block diagram of a pipelined microprocessor including a branch control apparatus according to the present invention.

Referring now to FIG. 1, a block diagram of portions of a pipelined microprocessor 100 including a branch control apparatus according to the present invention is shown. In one embodiment, the microprocessor 100 comprises an x86 architecture processor. In one embodiment, the microprocessor 100 comprises a 13-stage pipeline, comprising an instruction fetch stage, multiple instruction cache access stages, an instruction format stage, an instruction decode or translation stage, a register access stage, an address calculation stage, multiple data cache access stages, multiple execution stages, a store stage, and a write-back stage.

The microprocessor 100 includes an instruction cache 102 that caches instruction bytes. The instruction bytes are received from a memory via a data bus 166. The instruction cache 102 comprises an array of cache lines for storing instruction bytes. The array of cache lines is indexed by a fetch address 152. That is, the fetch address 152 selects one of the cache lines in the array. The instruction cache 102 outputs the selected cache line of instruction bytes via a data bus 142.

In one embodiment, the instruction cache 102 comprises a 64 KB 4-way set associative cache, with 32-byte cache lines per way. In one embodiment, one half of the selected cache line of instruction bytes is provided by the instruction cache 102 at a time, i.e., 16 bytes are provided during two separate periods each. In one embodiment, the instruction cache 102 is similar to an instruction cache described in U.S. patent application Ser. No. 09/849,736 entitled SPECULATIVE BRANCH TARGET ADDRESS CACHE, having a common assignee, and which is hereby incorporated by reference in its entirety for all purposes.

The microprocessor 100 also includes a branch target address cache (BTAC) 116. The BTAC 116 also receives the instruction cache 102 fetch address 152. The BTAC 116 comprises an array of storage elements for caching fetch addresses of previously executed branch instructions and their associated branch target addresses. The storage elements also store other speculative branch information related to the branch instructions for which the target addresses are cached. In particular, the storage elements store an indication of whether the multi-byte branch instructions wrap across two instruction cache lines. The fetch address 152 indexes the array of storage elements in the BTAC 116 to select one of the storage elements.

The BTAC 116 outputs a target address 132 and speculative branch information (SBI) 136 from the storage element selected by the fetch address 152. In one embodiment, the SBI 136 includes the branch instruction length, the location of the branch instruction in the cache line, whether the branch is a call or return instruction, and a prediction of whether the branch instruction will be taken or not taken, as described in U.S. patent application entitled SPECULATIVE BRANCH TARGET ADDRESS CACHE which is incorporated by reference above.

The BTAC 116 also outputs a HIT signal 134 that indicates whether the fetch address 152 hit in the BTAC 116. In one embodiment, the BTAC 116 is similar to a BTAC described in the above referenced U.S. Patent application. In particular, the BTAC 116 is a speculative BTAC because the microprocessor 100 branches to the target address 132 provided by the BTAC 116 before the instruction cache line provided by the instruction cache 102 is decoded to know whether or not a branch instruction is even present in the cache line selected by the fetch address. That is, the microprocessor 100 speculatively branches even though the possibility exists that no branch instruction is present in the cache line selected by the fetch address hitting in the BTAC 116.

The BTAC 116 also outputs a BWRAP signal 186, which specifies whether the branch instruction wraps across two cache lines. The BWRAP signal 186 value is cached in the BTAC 116 along with the branch instruction target address after execution of the branch instruction. The BWRAP signal 186 value is speculative since it only indicates whether the branch instruction wrapped beyond the cache line the last time it was executed. However, as described in the above referenced U.S. Patent application, in one embodiment, the cache line may have been modified since the last time the branch instruction was executed or the fetch address 152 of the cache line may have been virtually aliased.

The microprocessor 100 also includes control logic 122. The HIT signal 134, the SBI 136, and the BWRAP signal 186 are provided as inputs to the control logic 122. The operation of the control logic 122 is described in more detail below.

The microprocessor 100 also includes a mux 118. The mux 118 receives at least three addresses as inputs and selects one of the inputs as the fetch address 152 to the instruction cache 102 in response to control signal 168 from the control logic 122. The mux 118 receives the target address 132 from the BTAC 116. The mux 118 also receives a next sequential fetch address 162. The next sequential fetch address 162 is the previous fetch address incremented by the size of an instruction cache 102 cache line by an incrementer 124 that receives the fetch address 152 and provides the next sequential fetch address 162 to the mux 118.

The mux 118 also receives a resolved target address 164. The resolved target address 164 is provided by execution logic in the microprocessor 100. The execution logic calculates the resolved target address 164 based on a full decode of a branch instruction. If after branching to the target address 132 provided by the BTAC 116, the microprocessor 100 later determines that the branch was erroneous, the microprocessor 100 corrects the error by flushing the pipeline and branching to either the resolved target address 164 or to the fetch address of a cache line including the instruction following the branch instruction. In one embodiment, the microprocessor 100 corrects the error by flushing the pipeline and branching to the fetch address of a cache line including the branch instruction itself, if the microprocessor 100 determines that no branch instruction was present in the cache line 142 as presumed. The error correction is as described in U.S. patent application Ser. No. 09/849658 entitled APPARATUS, SYSTEM AND METHOD FOR DETECTING AND CORRECTING ERRONEOUS SPECULATIVE BRANCH TARGET ADDRESS CACHE BRANCHES, having a common assignee, and which is hereby incorporated by reference in its entirety for all purposes.

In one embodiment, the mux 118 also receives other target addresses predicted by other branch prediction elements, such as a call/return stack and a branch target buffer (BTB) that caches target addresses of indirect branch instructions based on the branch instruction pointer. The mux 118 selectively overrides the target address 132 provided by the BTAC 116 with the target address provided by the call/return stack or BTB as described in U.S. patent application Ser. No. 09/849799 entitled SPECULATIVE BRANCH TARGET ADDRESS CACHE WITH SELECTIVE OVERRIDE BY SECONDARY PREDICTOR BASED ON BRANCH INSTRUCTION TYPE, having a common assignee, and which is hereby incorporated by reference in its entirety for all purposes.

The microprocessor 100 also includes an instruction buffer 112. The instruction buffer 112 comprises a plurality of stages, or registers, referred to collectively or individually as stages 126, for storing instruction bytes received from the instruction cache 102 via data bus 142. In one embodiment, the instruction buffer 112 receives a 16-byte cache line from the instruction cache 102 at a time. In one embodiment, the instruction buffer 112 stages 126 are 16-bytes wide. In one embodiment, the instruction buffer 112 comprises a 128-byte buffer configured as 8 stages for storing 16 instruction bytes each. FIG. 1 shows only the lower four stages of the instruction buffer 112. The bottom stage is denoted stage A 126A. Stage B 126B is the next stage above stage A 126A. Stage C 126C is the next stage above stage B 126B. Stage D 126D is the next stage above stage C 126C.

The instruction buffer 112 is configured as a first-in-first-out shift register that has a bottom and a top. The instruction buffer 112 receives instruction bytes in the top from the instruction cache 102, and shifts stages 126 out the bottom. The instruction buffer 112 is capable of shifting out the bottom one or two stages 126 at a time. That is, the instruction buffer 112 is capable of shifting out stage A 126A in a clock cycle; or, the instruction buffer 112 is capable of shifting out stage A 126A and stage B 126B together in a clock cycle. The control logic 122 provides a shift signal 188 that determines the number of stages 126 the instruction buffer 112 shifts out, as will be described below. When the instruction cache 102 provides a cache line to the instruction buffer 112, the cache line is placed into the empty stage 126 nearest the bottom of the instruction buffer 112.

The microprocessor 100 also includes a plurality of registers 174. Each of the registers 174 stores a target address 132 received from the BTAC 116. Each of the registers 174 is associated with one of the plurality of instruction buffer 112 stages 126. FIG. 1 shows four registers 174A–D associated with stages 126A–D. The target address stored in the register 174 is predicted by the BTAC 116 for a branch instruction stored in the associated stage 126.

The microprocessor 100 also includes a plurality of registers 104. Each of the registers 104 stores a BTAC branch indicator 192 received from the control logic 122. Each of the registers 104 is associated with one of the plurality of instruction buffer 112 stages 126 and target address registers 174. FIG. 1 shows four registers 104A–D associated with stages 126A–D and target address registers 174A–D. The BTAC branch indicator 192 stored in register 104 specifies whether the microprocessor 100 speculatively branched to a target address received from the BTAC 116 stored in the associated register 174 on the presumption that a branch instruction is present in the associated stage 126. The microprocessor 100 branches to a target address 132 provided by the BTAC 116 if the BTAC 116 asserts the HIT signal 134 and the branch instruction is predicted taken. In one embodiment, the BTAC 116 provides a prediction of whether the branch instruction will be taken or not taken in the SBI 136. One of the BTAC branch indicators stored in register 104 is provided on an output 193 to the control logic 122.

In one embodiment, control logic 122 outputs a 16-bit value on the BTAC branch indicator signal 192, which is stored in the registers 104 and provided on output 193 to the control logic 122. The 16 bits correspond to the 16 bytes of the corresponding stage 126. A bit with a true value indicates that the corresponding byte in the stage 126 is the first byte of a branch instruction for which the microprocessor 100 branched to a target address 132 provided by the BTAC 116.

The microprocessor 100 also includes a 3-input stage swap mux 106. The stage swap mux 106 receives three stages 126A–C of instruction bytes from the instruction buffer 112 via data buses 144A–C, respectively. The stage swap mux 106 selects one of the three stages 126A–C based on a control signal 154 generated by the control logic 122, as will be described below.

In one embodiment, each of the data buses 144A–C are 26-bits wide. The data buses 144A–C provide the 16 bytes of the respective stages 126A–C, and in addition supply a shadow of the first 10 bytes of the stage above. For example, data bus 144A provides the 16 bytes [0:15] of stage A 126A in addition to the first 10 bytes [0:9] of stage B 126B.

Instructions in an x86 processor are variable in length and may be up to 11 bytes long. Hence, in the case of an 11-byte instruction in which the first byte of the instruction is in the last byte location of stage A 126A, the last 10 bytes of the instruction will be in the first 10 byte locations of stage B 126B. Advantageously, by providing a 16-byte stage and a 10-byte shadow of the stage above, the stage swap mux 106 always provides enough instruction bytes to insure that at least one full x86 instruction is present in the selected one of the data buses 144A–C regardless of where on the 26-byte data bus 144 the next instruction begins.

The microprocessor 100 also includes a byte-wise alignment mux 108. The byte-wise alignment mux 108 receives the instruction bytes from one of the data buses 144A–C selected by the stage swap mux 106 via data bus 146. In one embodiment, the byte-wise alignment mux 108 comprises a set of muxes that align the 26 instruction bytes received from the stage swap mux 106 such that the next byte to be formatted, i.e., the first byte of the next instruction to be formatted, is output on the first byte lane of an 11-byte data bus 148. The byte-wise alignment mux 108 aligns the bytes based on a control signal 156 generated by the control logic 122. The control logic 122 generates control signal 156 based on a current pointer signal 158 that points to the first byte of the next instruction to be formatted.

For example, assume the last byte of the last instruction formatted was in byte 3 of the data bus 146, and therefore the first byte of the next instruction to be formatted was in byte 4 of the data bus 146. The byte-wise alignment mux 108 aligns the bytes from data bus 146 such that byte 4 of data bus 146 is provided on byte 0 of data bus 148, byte 5 of data bus 146 is provided on byte 1 of data bus 148, and so forth up to byte 14 provided on byte 10 of data bus 148.

The microprocessor 100 also includes instruction format logic 114. The instruction format logic 114 receives instruction bytes from the instruction buffer 112 via data bus 148. The instruction format logic 114 examines, or views, the contents of the instruction buffer 112 stage 126, and associated shadow, selected by the stage swap mux 106, and aligned by the byte-wise alignment mux 108. The instruction format logic 114 formats, or parses, the instruction bytes received into an instruction. In particular, the instruction format logic 114 determines the size in bytes of the instruction. The instruction format logic 114 provides the formatted instruction to the remainder of the microprocessor 100 pipeline for further decode and execution. Advantageously, the instruction buffer 112 buffers instruction bytes in order to reduce the probability of starvation of the instruction format logic 114.

The instruction format logic 114 provides the length of the currently formatted instruction via control signal 172. In one embodiment, the instruction length 172 comprises four bits. The instruction length 172 is used to control the shifting of the instruction buffer 112 by the control logic 172 via control signal 188. That is, control signal 188 serves as a shift count for the instruction buffer 112. The control logic 122 also uses the shift count 188 to control the loading of instruction bytes into the instruction buffer 112.

In one embodiment, the instruction format logic 114 is capable of formatting multiple instructions per processor 100 clock cycle. The instruction length signal 172 indicates the sum of the instruction lengths of the multiple formatted instructions. In one embodiment, the maximum sum indicated on the instruction length signal 172 is 15 bytes.

Advantageously, the stage swap mux 106 provides a means for the instruction format logic 114 to see the appropriate stage 126 of instruction bytes for formatting without requiring the instruction buffer 112 to have already shifted out already formatted stages 126. Consequently, the timing of shifting a stage 126 out of the instruction buffer 112 is decoupled from the timing of providing a stage 126 to the instruction format logic 114. This is advantageous for microprocessor clock timing.

The microprocessor 100 also includes a register 184 that stores and outputs the current pointer 158. The current pointer 158 specifies a location within an instruction buffer 112 stage 126 that is currently being formatted by the instruction format logic 114. That is, the current pointer 158 points to the first byte of the instruction to be formatted by the instruction format logic 114. The current pointer 158 is provided to the control logic 122. The control logic 122 uses the current pointer 158 to generate control signals 154, 156, and 188. In one embodiment, the current pointer 158 comprises four bits for specifying any of the 16 bytes in one of the instruction buffer 112 stages 126.

The microprocessor 100 also includes an adder 182. The adder 182 receives the instruction length 172 and current pointer 158 and generates their sum 198. The sum 198 is the next pointer 198, or pointer to the next instruction to be formatted, if the next instruction is sequential, i.e., if the currently formatted instruction is not a taken branch instruction.

The next pointer 198 is provided to a mux 128. The mux 128 also receives the lower four bits of the target address stored in one of the registers 174 associated with the stage 126 selected by the stage swap mux 106. The control logic 122 controls the mux 128 to select the next pointer 198 if the BTAC branch indicator 193 indicates the currently formatted instruction is not a taken branch instruction. The control logic 122 controls the mux 128 to select the target address 138 received from registers 174 if the BTAC branch indicator 193 indicates the currently formatted instruction is a taken branch instruction, i.e., a branch instruction for which the microprocessor 100 branched to a target address 132 provided by the BTAC 116. The output of the mux 128 is stored in the current pointer register 184.

The adder 182 also generates a carry signal 196. The carry signal 196 is true of the sum 198 of the current pointer 158 and instruction length 172 generate a carry. In particular, the carry signal 196 indicates whether a byte in the currently formatted instruction occupies the last byte of its stage 126. For example, assume the currently formatted instruction begins at byte 13 of the selected stage 126, i.e., the current pointer 158 is 0x D. Assume the instruction format logic 114 determines the currently formatted instruction has an instruction length 172 of 3 bytes, i.e., the instruction occupies bytes 13, 14, and 15 of the stage 126, which are the last 3 bytes of the stage 126. In this example, the sum of the current pointer 158 and the instruction length 172 is 0x10. Hence, the next pointer 198 generated by adder 182 is 0x0, and the carry 196 is 1, or true.

By contrast, assume the currently formatted instruction begins at byte 12. That is, the instruction occupies byte locations 12, 13, and 14 in the stage, but not byte location 15. In this case, the sum is 0x F. Hence, the next pointer 198 is 0x F, and the carry 196 is 0, or false. The carry signal 196 is provided to the control logic 122. The control logic 122 uses the carry signal 196 to generate control signals 154, 156, and 188.

The microprocessor 100 also includes a comparator 178 that receives the next pointer 198 and compares the next pointer 198 with zero. If the next pointer 198 is not equal to zero, the comparator 178 outputs a true value. If the next pointer 198 is equal to zero, the comparator 178 outputs a false value.

The output of the comparator 178 is provided to an AND gate 176. The AND gate 176 also receives the carry signal 196. The output of the AND gate 176 is an fwrap signal 194. The fwrap signal 194 indicates whether the currently formatted instruction wraps beyond its stage 126 as determined by the instruction format logic 114. For example, assume the currently formatted instruction begins at byte 13 of the selected stage 126, i.e., the current pointer 158 is 0x D. Assume the instruction format logic 114 determines the currently formatted instruction has an instruction length 172 of 3 bytes, i.e., the instruction occupies bytes 13, 14, and 15 of the stage 126, the last 3 bytes of the stage 126. In this example, the sum of the current pointer 158 and the instruction length 172 is 0x10. Hence, the next pointer 198 generated by adder 182 is 0x0, and the carry 196 is 1, or true. The output of the comparator 178 is false, since the next pointer 198 is equal to zero, i.e., not not equal to zero. Consequently, the fwrap signal 194 is false since one of the inputs to AND gate 176 (the output of the comparator 178) is false.

By contrast, assume the currently formatted instruction begins at byte 14. That is, assume the first two bytes of the instruction occupy the last two byte locations in the stage, and the last byte of the instruction occupies the first byte location in the next stage above. In this case, the sum is 0x11. Hence, the next pointer 198 is 0x1, and the carry 196 is true. The output of the comparator 178 is true since the next pointer 198 is not equal to zero. Consequently, the fwrap signal 194 is true since the output of the comparator 178 is true and the carry signal 196 is true.

The fwrap signal 194 is provided to the control logic 122. The control logic 122 uses the fwrap signal 194 to generate control signals 154, 156, and 188. The fwrap signal 194 provides a true indication of whether the formatted instruction wraps across two instruction buffer 112 stages 126 since the fwrap signal 194 is based on a decode of the instruction bytes in the stage 126. In contrast, the BWRAP signal 186 provides a speculative indication of whether a branch instruction wraps across two cache lines since it is made before the instruction is decoded.

Figure 2:
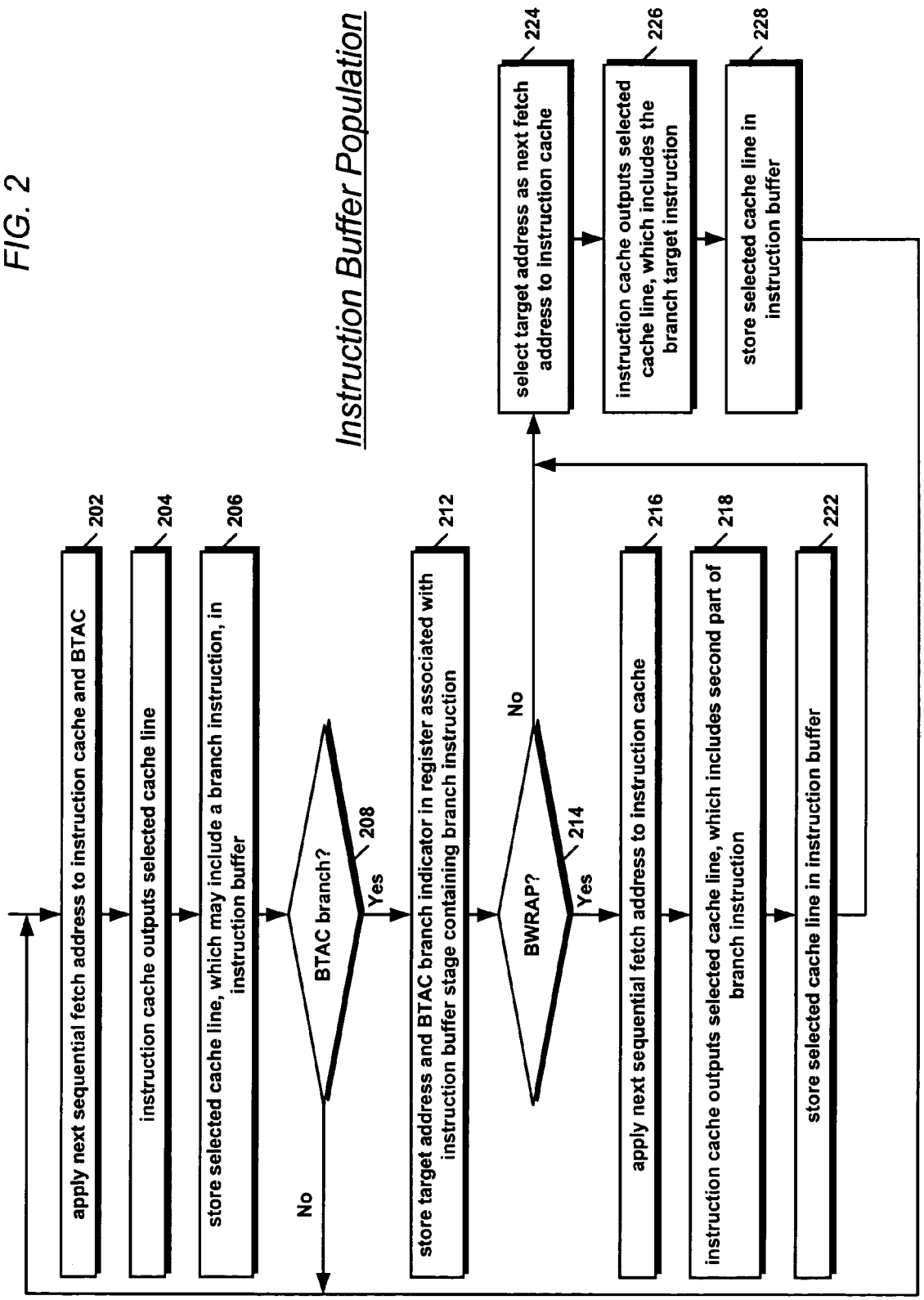
FIG. 2 is a flowchart illustrating population of the instruction buffer of FIG. 1 according to the present invention.

Referring now to FIG. 2, a flowchart illustrating population of the instruction buffer 112 of FIG. 1 according to the present invention is shown. Flow begins at block 202.

At block 202, the next sequential fetch address 162 of FIG. 1 is selected by the mux 118 of FIG. 1 as fetch address 152 of FIG. 1, which is applied to the instruction cache 102 of FIG. 1 and to the BTAC 116 of FIG. 1. Flow proceeds from block 202 to block 204.

At block 204, the instruction cache 102 outputs a cache line on data bus 142 of FIG. 1 selected by the fetch address 152 applied during step 202. Flow proceeds from block 204 to block 206.

At block 206, the selected cache line output by the instruction cache 102 during step 204 is stored in the instruction buffer 112. The cache line is stored into the first empty stage 126 closest to the bottom of the instruction buffer 112. The selected cache line may contain a branch instruction for which the BTAC 116 has cached a target address. Flow proceeds from block 206 to decision block 208.

At decision block 208, the control logic 122 determines whether a BTAC 116 branch will occur. That is, the control logic 122 examines the BTAC HIT signal 134 to determine if a hit of the fetch address 152 applied to the BTAC 116 during step 202 has occurred and whether the branch instruction associated with the target address 132 output by the BTAC 116 is predicted taken. If not, flow returns to block 202 for fetching of the next sequential cache line. Otherwise, flow proceeds to block 212.

At block 212, the target address 132 output by the BTAC 116 is stored into one of the registers 174 associated with the stage 126 in which the branch instruction was stored during step 206. In addition, the control logic 122 outputs the BTAC branch indicator 192 with a true value, which is stored into one of the registers 104 associated with the stage 126 in which the branch instruction was stored during step 206. In one embodiment, the bit in the BTAC branch indicator 192 associated with the first byte of the branch instruction in the stage 126 is set to a true value to signify that the microprocessor 100 branched to the target address 132 provided by the BTAC 116, which will occur during step 224. Flow proceeds from block 212 to decision block 214.

At decision block 214, the control logic 122 determines whether the BTAC 116 predicts that the branch instruction wraps across cache lines. That is, the control logic 122 of FIG. 1 determines whether the BWRAP signal 186 of FIG. 1 is true. If it is, flow proceeds to block 216. Otherwise, flow proceeds to block 224.

At block 216, the next sequential fetch address 162 is applied to the instruction cache 102. If flow reaches block 216, then only the first part of the branch instruction is present in the cache line stored in the instruction buffer 112 during step 206, as indicated by the BWRAP signal 186 during step 214. That is, the second part of the branch instruction bytes have not yet been output by the instruction cache 102 and stored into the instruction buffer 112. Hence, it is necessary that the target address 132 provided by the BTAC 116 not be applied to the instruction cache 102 until the second part of the branch instruction is output by the instruction cache 102 so it may be stored into the instruction buffer 112. Flow proceeds from block 216 to block 218.

At block 218, the instruction cache 102 outputs the cache line selected by the next sequential fetch address 162 provided during step 216. The outputted cache line speculatively includes the second part of the branch instruction as indicated by the BWRAP signal 186. Flow proceeds from block 218 to block 222.

At block 222, the cache line containing the second part of the branch instruction is stored into the instruction buffer 112. The cache line containing the second part of the branch instruction is stored into the stage 126 of the instruction buffer 112 immediately above the stage 126 containing the first part of the branch instruction. Flow proceeds from block 222 to block 224.

At block 224, mux 118 selects target address 132 provided by the BTAC 116 as the next fetch address 152 for the instruction cache 102. At this point, the entire branch instruction has been stored in the instruction buffer 112. If flow proceeded to block 224 from decision block 214, then the branch instruction is contained in one stage 126 of the instruction buffer 112. If flow proceeded to block 224 from block 222, then the branch instruction is contained in two adjacent stages 126 of the instruction buffer 112. Flow proceeds from block 224 to block 226.

At block 226, the instruction cache 102 outputs the cache line selected by the target address 132 applied to the instruction cache 102 during step 224. The selected cache line contains the target instruction, or instructions, of the branch instruction. Flow proceeds from block 226 to block 228.

At block 228, the cache line containing the target instructions is stored in the instruction buffer 112. The cache line containing the target instructions is stored into the stage 126 of the instruction buffer 112 immediately above the stage 126 containing the entire branch instruction or the second part of the branch instruction, depending upon whether the branch instruction wrapped across multiple cache lines. Flow proceeds from block 228 back to block 202.

Figure 3:
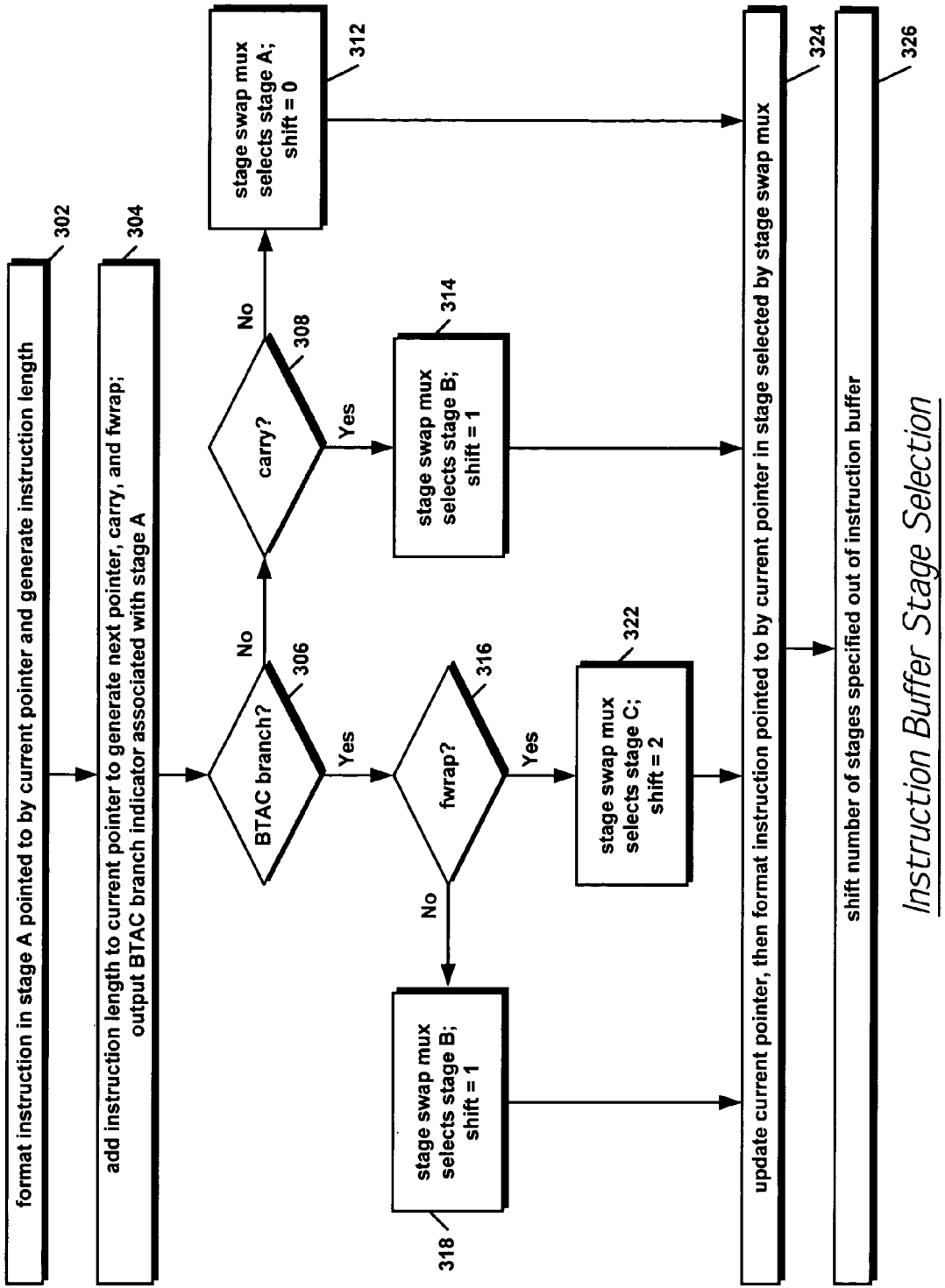
FIG. 3 is a flowchart illustrating selection of the instruction buffer stages of FIG. 1 according to the present invention.

Referring now to FIG. 3, a flowchart illustrating selection of the instruction buffer 112 stages 126 of FIG. 1 according to the present invention is shown. Flow begins at block 302.

At block 302, the instruction format logic 114 of FIG. 1 formats an instruction in stage A 126A of the instruction buffer 112 of FIG. 1. The instruction format logic 114 formats the instruction pointed to by the current pointer 158 of FIG. 1 and generates the instruction length 172 of FIG. 1 of the instruction. Flow proceeds from block 302 to block 304.

At block 304, the adder 182 of FIG. 1 adds the instruction length 172 to the current pointer 158 to generate the next pointer 198 of FIG. 1 and the carry signal 196 of FIG. 1. Also, the AND gate 176 generates the fwrap signal 194 of FIG. 1. In addition, the BTAC branch indicator stored in register 104A is output on BTAC branch indicator signal 193 of FIG. 1. Flow proceeds from block 304 to decision block 306.

At decision block 306, the control logic 122 determines whether the instruction formatted during step 302 is a branch instruction for which the microprocessor 100 branched during step 224 of FIG. 2. That is, the control logic 122 determines whether the BTAC branch indicator 193 output during step 304 is true. In one embodiment, the control logic 122 determines whether the bit in the BTAC branch indicator 193 corresponding to the current pointer 158 is true. If not, flow proceeds to decision block 308. Otherwise, flow proceeds to decision block 316.

At decision block 308, the control logic 122 determines whether the carry signal 196 is true. If not, flow proceeds to block 312. Otherwise, flow proceeds to block 314.

At block 312, the control logic 122 generates control signal 154 to control the stage swap mux 106 of FIG. 1 to select stage A 126A for provision on data bus 146 for formatting by the instruction format logic 114. In addition, the control logic 122 generates a value of zero on shift signal 188. Flow proceeds from block 312 to block 324.

At block 314, the control logic 122 generates control signal 154 to control the stage swap mux 106 of FIG. 1 to select stage B 126B for provision on data bus 146 for formatting by the instruction format logic 114. In addition, the control logic 122 generates a value of one on shift signal 188. Flow proceeds from block 314 to block 324.

At decision block 316, the control logic 122 determines whether the fwrap signal 194 of FIG. 1 is true. If not, flow proceeds to block 318. Otherwise, flow proceeds to block 322.

At block 318, the control logic 122 generates control signal 154 to control the stage swap mux 106 of FIG. 1 to select stage B 126B for provision on data bus 146 for formatting by the instruction format logic 114. In addition, the control logic 122 generates a value of one on shift signal 188. Flow proceeds from block 318 to block 324.

At block 322, the control logic 122 generates control signal 154 to control the stage swap mux 106 of FIG. 1 to select stage C 126C for provision on data bus 146 for formatting by the instruction format logic 114. In addition, the control logic 122 generates a value of two on shift signal 188. Flow proceeds from block 322 to block 324.

At block 324, the current pointer 158 is updated. That is, mux 128 of FIG. 1 selects either the next pointer 198 or the target address 138 of FIG. 1 and stores the selected value in register 184. If flow proceeded from block 312 or 314, then the mux 128 selects the next pointer 198. Otherwise, the mux 128 selects the target address 138. In addition, the instruction format logic 114 formats the instruction pointed to by the updated current pointer 158 in the stage selected by the stage swap mux 106 during step 312, 314, 318, or 322. Flow proceeds from block 324 to block 326.

At block 326, the instruction buffer 112 shifts out the number of stages specified by the shift signal 188 during step 312, 314, 318, or 322 so that stage A is now at the bottom of the instruction buffer 112 again. The instruction buffer 112 shifts out the specified number of stages after the stage swap mux 106 selects the appropriate stage 126 for provision to the instruction format logic 114.

Figure 4A:
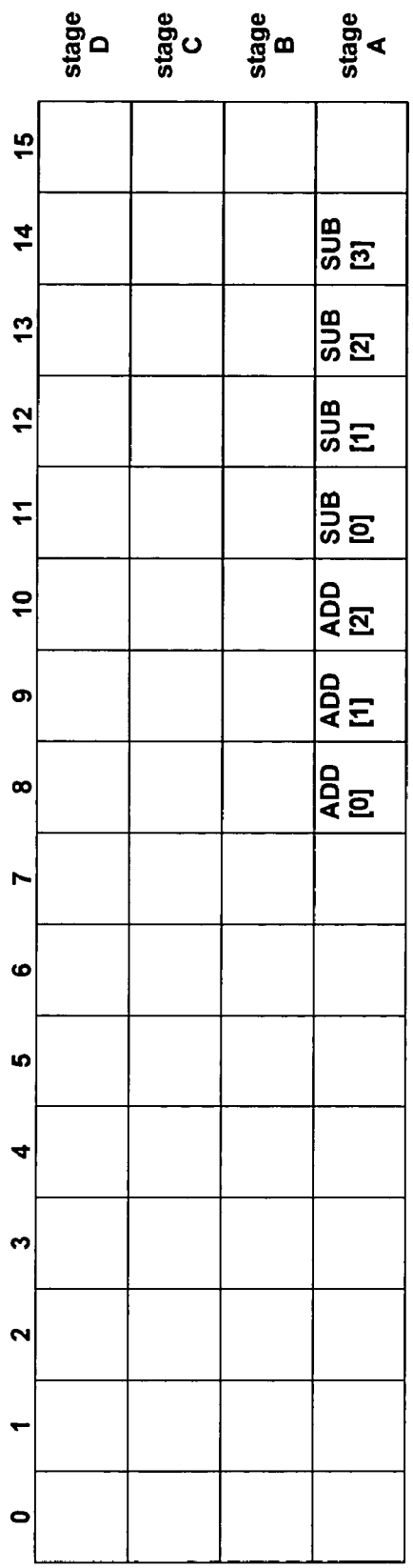
Figure 4C:
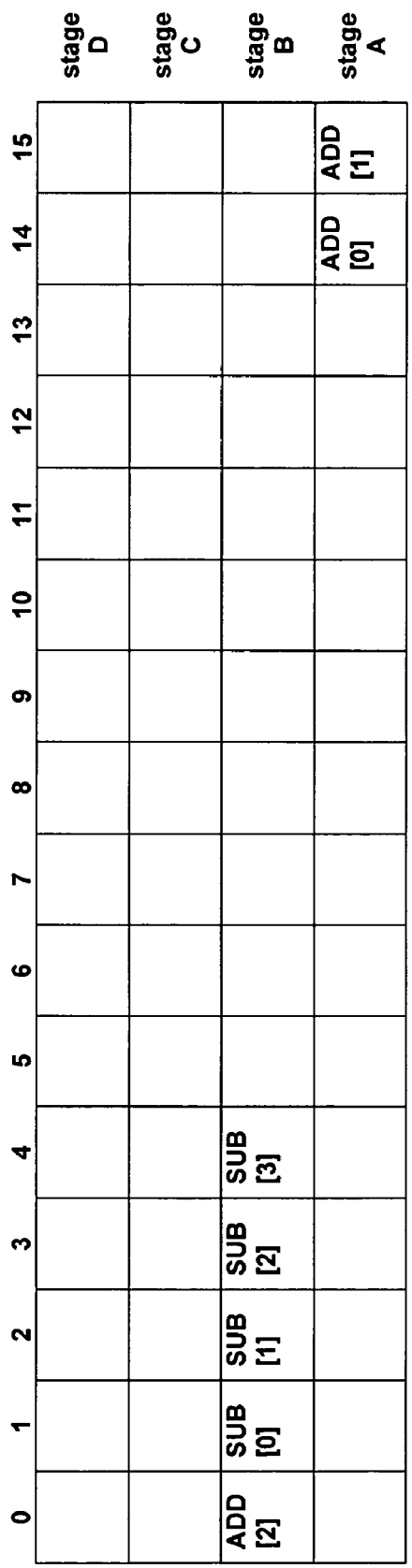
Figure 4D:
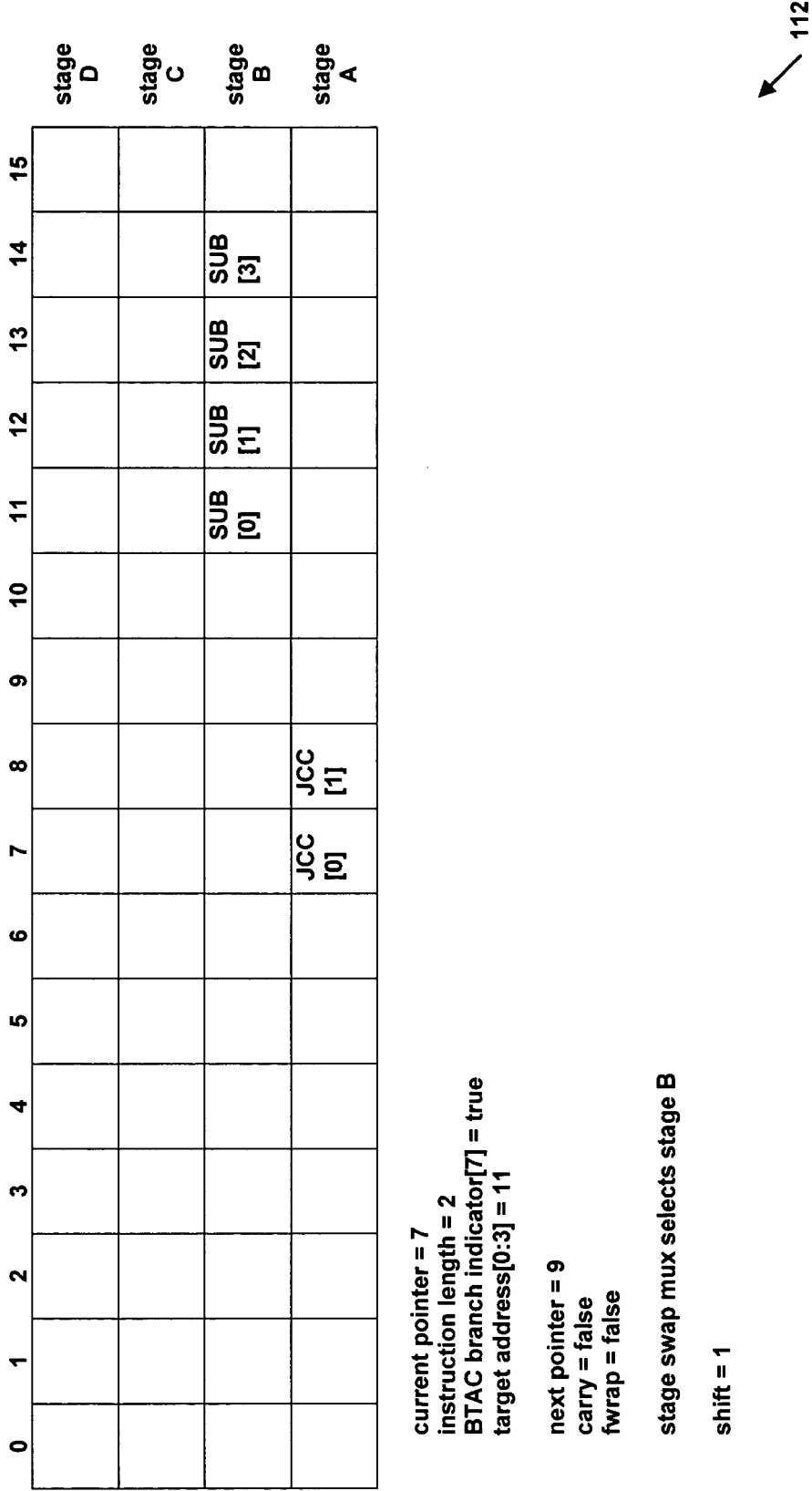

Referring now to FIGS. 4A–F, referred to collectively as FIG. 4, six tables illustrating examples of selection of the instruction buffer 112 stages 126 of FIG. 1 according to the flowchart of FIG. 3 according to the present invention are shown. Each of the tables in FIG. 4 comprises four rows corresponding to stages A–D 126A–D of the instruction buffer 112 and labeled accordingly. Each of the tables comprises 16 columns corresponding to the 16 byte locations within each of the stages 126 labeled 0 through 15 from left to right. Each cell of the tables is either blank or populated with the content of an instruction byte. Three different instructions are used to illustrate: a three-byte ADD (x86 add instruction), a four-byte SUB (x86 subtract instruction), and a two-byte JCC (x86 conditional jump, or branch, instruction). Each byte of the instructions is labeled with brackets enclosing a number corresponding to the byte of the instruction. For example, "SUB[2]" denotes the third byte, referred to as byte 2, of the SUB instruction.

The six different tables illustrate six different contents for illustrating six different combinations of the currently formatted instruction being a branch/non-branch, fwrap 194 true/false, and carry 196 true/false. For each case, the initial condition values of the current pointer 158, instruction length 172, BTAC branch indicator 193, and target address 138 lower four bits are specified. In addition, the next pointer 198, carry 196, and fwrap 194 value generated by the control apparatus of FIG. 1 from the initial conditions are shown for each case. Finally, the stage 126 of the instruction buffer 112 selected by the stage swap mux 106 and shift value 188 generated by the control logic 122 in response to the initial conditions and generated values are shown for each case. Although FIG. 4 shows an embodiment in which the bytes are shown in big endian format, in another embodiment the microprocessor 100 is a little endian microprocessor 100, and the bytes are numbered opposite to what is shown in FIG. 4.

FIG. 4A illustrates Case 1, in which the currently formatted instruction is a non-branch instruction which does not wrap across two instruction buffer 112 stages, and which does not occupy the last byte of its stage. The 3-byte ADD instruction is located in bytes 8 through 10 of stage A 126A. The 4-byte SUB instruction is located in bytes 11 through 14 of stage A 126A. The current pointer 158 value is 8, pointing to the first byte of the ADD instruction, and the instruction length 172 generated by the instruction format logic 114 during step 302 of FIG. 3 is 3. The BTAC branch indicator 193 output during step 304 of FIG. 3 is false. The target address 138 output during step 324 is not applicable since the currently formatted instruction is not a branch instruction.

During step 304 of FIG. 3, the next pointer 198 generated by the adder 182 is 11, the carry signal 196 generated by the adder 182 is false, and the fwrap signal 194 generated by the AND gate 176 is false. Because the currently formatted instruction is a non-branch instruction that does not occupy the last byte of its stage, the next instruction to be formatted by the instruction format logic 114 begins in the same stage as the currently formatted instruction. Consequently, the control logic 122 controls the stage swap mux 106 to select stage A 126A, and to shift out zero stages. This action corresponds to block 312 of FIG. 3.

FIG. 4B illustrates Case 2, in which the currently formatted instruction is a non-branch instruction which does not wrap across two instruction buffer 112 stages, but which does occupy the last byte of its stage. The 3-byte ADD instruction is located in bytes 13 through 15 of stage A 126A. The 4-byte SUB instruction is located in bytes 0 through 3 of stage B 126B. The current pointer 158 value is 13, pointing to the first byte of the ADD instruction, and the instruction length 172 generated by the instruction format logic 114 during step 302 is 3. The BTAC branch indicator 193 output during step 304 is false. The target address 138 output during step 324 is not applicable since the currently formatted instruction is not a branch instruction.

During step 304, the next pointer 198 generated by the adder 182 is 0, the carry signal 196 generated by the adder 182 is true, and the fwrap signal 194 generated by the AND gate 176 is false. Because the currently formatted instruction is a non-branch instruction that occupies the last byte of its stage, the next instruction to be formatted by the instruction format logic 114 begins in the stage above the currently formatted instruction stage. Consequently, the control logic 122 controls the stage swap mux 106 to select stage B 126B, and to shift out one stage. This action corresponds to block 314 of FIG. 3.

FIG. 4C illustrates Case 3, in which the currently formatted instruction is a non-branch instruction which wraps across two instruction buffer 112 stages, and which occupies the last byte of its stage. The first two bytes of the 3-byte ADD instruction are located in bytes 14 and 15 of stage A 126A. The third byte of the 3-byte ADD instruction is located in byte 0 of stage B 126B. The 4-byte SUB instruction is located in bytes 1 through 4 of stage B 126B. The current pointer 158 value is 14, pointing to the first byte of the ADD instruction, and the instruction length 172 generated by the instruction format logic 114 during step 302 is 3. The BTAC branch indicator 193 output during step 304 is false. The target address 138 output during step 324 is not applicable since the currently formatted instruction is not a branch instruction.

During step 304, the next pointer 198 generated by the adder 182 is 1, the carry signal 196 generated by the adder 182 is true, and the fwrap signal 194 generated by the AND gate 176 is true. Because the currently formatted instruction is a non-branch instruction that occupies the last byte of its stage, the next instruction to be formatted by the instruction format logic 114 begins in the stage above the currently formatted instruction stage. Consequently, the control logic 122 controls the stage swap mux 106 to select stage B 126B, and to shift out one stage. This action corresponds to block 314 of FIG. 3.

FIG. 4D illustrates Case 4, in which the currently formatted instruction is a branch instruction which does not wrap across two instruction buffer 112 stages, and which does not occupy the last byte of its stage. The 2-byte JCC instruction is located in bytes 7 and 8 of stage A 126A. The 4-byte SUB instruction, which is the target instruction of the branch instruction, is located in bytes 11 through 14 of stage B 126B. The current pointer 158 value is 7, pointing to the first byte of the JCC instruction, and the instruction length 172 generated by the instruction format logic 114 during step 302 is 2. Bit 7 of the BTAC branch indicator 193 output during step 304 is true, since byte 7 of stage A 126A contains the first byte of the JCC instruction, which is the branch instruction for which a BTAC 116 branch was previously performed. The target address 138 output during step 324 is 11 to point to the target instruction.

During step 304, the next pointer 198 generated by the adder 182 is 9. However, mux 128 selects the target address 138 value of 11 since the BTAC branch indicator is true. The carry signal 196 generated by the adder 182 is false, and the fwrap signal 194 generated by the AND gate 176 is false. Because the currently formatted instruction is a branch instruction that does not wrap across two instruction buffer 112 stages, the next instruction to be formatted by the instruction format logic 114, the target instruction, begins in the stage above the currently formatted instruction stage. Consequently, the control logic 122 controls the stage swap mux 106 to select stage B 126B, and to shift out one stage. This action corresponds to block 318 of FIG. 3.

FIG. 4E illustrates Case 5, in which the currently formatted instruction is a branch instruction which does not wrap across two instruction buffer 112 stages, but which occupies the last byte of its stage. The 2-byte JCC instruction is located in bytes 14 and 15 of stage A 126A. The 4-byte SUB instruction, which is the target instruction of the branch instruction, is located in bytes 11 through 14 of stage B 126B. The current pointer 158 value is 14, pointing to the first byte of the JCC instruction, and the instruction length 172 generated by the instruction format logic 114 during step 302 is 2. Bit 14 of the BTAC branch indicator 193 output during step 304 is true, since byte 14 of stage A 126A contains the first byte of the JCC instruction, which is the branch instruction for which a BTAC 116 branch was previously performed. The target address 138 output during step 324 is 11 to point to the target instruction.

During step 304, the next pointer 198 generated by the adder 182 is 0. However, mux 128 selects the target address 138 value of 11 since the BTAC branch indicator is true. The carry signal 196 generated by the adder 182 is true, and the fwrap signal 194 generated by the AND gate 176 is false. Because the currently formatted instruction is a branch instruction that does not wrap across two instruction buffer 112 stages, the next instruction to be formatted by the instruction format logic 114, the target instruction, begins in the stage above the currently formatted instruction stage. Consequently, the control logic 122 controls the stage swap mux 106 to select stage B 126B, and to shift out one stage. This action corresponds to block 318 of FIG. 3.

FIG. 4F illustrates Case 6, in which the currently formatted instruction is a branch instruction that wraps across two instruction buffer 112 stages. The first byte of the 2-byte JCC instruction is located in byte 15 of stage A 126A. The second byte of the 2-byte JCC instruction is located in byte 0 of stage B 126B. The 4-byte SUB instruction, which is the target instruction of the branch instruction, is located in bytes 11 through 14 of stage C 126C. The current pointer 158 value is 15, pointing to the first byte of the JCC instruction, and the instruction length 172 generated by the instruction format logic 114 during step 302 is 2. Bit 15 of the BTAC branch indicator 193 output during step 304 is true, since byte 15 of stage A 126A contains the first byte of the JCC instruction, which is the branch instruction for which a BTAC 116 branch was previously performed. The target address 138 output during step 324 is 11 to point to the target instruction.

During step 304, the next pointer 198 generated by the adder 182 is 1. However, mux 128 selects the target address 138 value of 11 since the BTAC branch indicator is true. The carry signal 196 generated by the adder 182 is true, and the fwrap signal 194 generated by the AND gate 176 is true. Because the currently formatted instruction is a branch instruction that wraps across two instruction buffer 112 stages, the next instruction to be formatted by the instruction format logic 114, the target instruction, begins in the stage two above the currently formatted instruction stage. Consequently, the control logic 122 controls the stage swap mux 106 to select stage C 126C, and to shift out two stages. This action corresponds to block 322 of FIG. 3.

Although the present invention and its objects, features, and advantages have been described in detail, other embodiments are encompassed by the invention. For example, the width and size of the instruction buffer may vary. Advantageously, the present invention is capable of operating with large instruction buffers.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A microprocessor having an instruction cache for providing a plurality of instruction bytes in response to a fetch address, the microprocessor also having a branch predictor for predicting in response to the fetch address whether a branch instruction is present in the plurality of instruction bytes provided by the instruction cache and for providing a prediction of whether or not the branch instruction will be taken, the microprocessor also having branch control logic that provides an indication of whether or not the microprocessor fetched a plurality of instruction bytes from the instruction cache at a target address of the branch instruction in response to the prediction, comprising:
   an instruction buffer, comprising a plurality of stages each for buffering a plurality of instruction bytes received from the instruction cache; a branch indicator associated with each of said plurality of stages, for storing the indication of whether or not the microprocessor fetched a plurality of instruction bytes for storage in said instruction buffer from the instruction cache at the target address of the branch instruction buffered in said associated stage;
   instruction format logic, for examining said plurality of instruction bytes stored in a first at least one of said plurality of instruction buffer stages during a first clock cycle, for outputting a length of an instruction currently being formatted by said instruction format logic comprised in said first at least one of said plurality of instruction buffer stages, and for examining said plurality of instruction bytes stored in a second at least one of said plurality of instruction buffer stages during a second clock cycle subsequent to said first clock cycle; and
   a multiplexer, coupled between said instruction buffer and said instruction format logic, for selecting said first at least one of said plurality of stages for said instruction format logic to examine during said first clock cycle, and for selecting said second at least one of said plurality of stages for said instruction format logic to examine during said second clock cycle based on said branch indicator associated with said first at least one of said plurality of stages and based on said length of said currently formatted instruction output by said instruction format logic.

2. The microprocessor of claim 1, wherein said first and second at least one of said plurality of stages may or may not be different ones of said plurality of stages depending upon said branch indicator and said currently formatted instruction length.

3. The microprocessor of claim 1, further comprising:
   a current instruction pointer, coupled to said instruction format logic, for specifying a location of said currently formatted instruction within said first at least one of stages.

4. The microprocessor of claim 3, further comprising:
   an adder, coupled to said instruction pointer, for generating a sum of said current instruction pointer and said current instruction pointer length to generate a next said current pointer value.

5. The microprocessor of claim 4, wherein said adder also generates a carry of said sum of said current instruction pointer and said current instruction pointer length.

6. The microprocessor of claim 1, further comprising:
   a branch target address cache, coupled to receive the fetch address of said instruction cache, for providing said target address of said branch instruction as a subsequent fetch address to said instruction cache.

7. The microprocessor of claim 6, wherein said branch target address cache provides an indication of whether or not said instruction cache fetch address hit in said branch target address cache.

8. The microprocessor of claim 7, further comprising:
   control logic, coupled to said multiplexer, for populating said branch indicator based on said indication of whether or not said fetch address hit in said branch target address cache.

9. The microprocessor of claim 1, wherein the microprocessor is configured to execute variable length instructions.

10. The microprocessor of claim 1, wherein said branch indicator comprises a plurality of indications corresponding to the plurality of bytes stored in said associated stage, wherein each of said plurality of indications indicates whether its corresponding byte comprises a beginning byte of the branch instruction from whose target address the microprocessor fetched a plurality of instruction bytes from the instruction cache in response to the prediction.

11. A pre-decode stage in a microprocessor, the microprocessor having an instruction cache for providing instruction bytes in response to a fetch address, the microprocessor also having a branch predictor for predicting in response to the fetch address whether a branch instruction is present in the instruction bytes provided by the instruction cache and for providing a prediction of whether or not the branch instruction will be taken, the microprocessor also having branch control logic that provides an indication of whether or not the fetch address branched to a target address of the branch instruction in response to the prediction, comprising:
   an instruction buffer, comprising at least stages A, B, and C, for buffering the instruction bytes provided by the instruction cache;
   a multiplexer, coupled to said instruction buffer, for selecting a first of said stages A, B, and C for provision to instruction format logic during a first clock cycle, and for selecting a second of said stages A, B, and C for provision to said instruction format logic during a second clock cycle subsequent to said first clock cycle;
   a branch indicator, coupled to said multiplexer, for providing the indication of whether or not the fetch address branched to a target address of a branch instruction present in said stage A; and
   a wrap indicator, coupled to said multiplexer, for indicating whether an instruction formatted by said instruction format logic during said first clock cycle wraps across said stages A and B;
   wherein said multiplexer selects one of said stages A, B, and C for provision to said instruction format logic during said second clock cycle based on said branch indicator and said wrap indicator.

12. The pre-decode stage of claim 11, wherein said instruction buffer stages A, B, and C are configured in a first-in-first-out manner, respectively.

13. The pre-decode stage of claim 11, further comprising an adder, coupled to said multiplexer, said adder comprising:
- a first input, for receiving a pointer to a location of said instruction within said stage A;
- a second input, for receiving a length of said instruction from said instruction format logic;
- a first output, for specifying a sum of said first and second inputs; and
- a second output, for indicating a carry of said sum.

14. The pre-decode stage of claim 13, wherein said wrap indicator indicates true only if said carry is true and said sum is not zero.

15. The pre-decode stage of claim 14, wherein said multiplexer selects stage C if said branch indicator indicates true and said wrap indicator indicates true.

16. The pre-decode stage of claim 15, wherein said instruction buffer shifts out said stages A and B after said multiplexer selects stage C.

17. The pre-decode stage of claim 14, wherein said multiplexer selects stage B if said branch indicator indicates true and said wrap indicator indicates false.

18. The pre-decode stage of claim 17, wherein said instruction buffer shifts out said stage A after said multiplexer selects stage B.

19. The pre-decode stage of claim 14, wherein said multiplexer selects stage B if said branch indicator indicates false and said second output indicates true.

20. The pre-decode stage of claim 19, wherein said instruction buffer shifts out said stage A after said multiplexer selects stage B.

21. The pre-decode stage of claim 14, wherein said multiplexer selects stage A if said branch indicator indicates false and said second output indicates false.

22. The pre-decode stage of claim 21, wherein said instruction buffer shifts out none of said stages A, B, and C after said multiplexer selects stage A.

23. The pre-decode stage of claim 11, wherein said multiplexer also provides to said instruction format logic along with said selected one of said stages A, B, and C a shadowed portion of one of said stages A, B, and C immediately above said selected one of said stages A, B, and C.

24. The pre-decode stage of claim 23, wherein said instruction comprises a variable length instruction.

25. The pre-decode stage of claim 24, wherein said variable length instruction comprises an x86 instruction.

26. The pre-decode stage of claim 25, wherein said shadowed portion comprises at least 10 instruction bytes.

27. A branch control apparatus in a microprocessor, the microprocessor having an instruction cache for providing first, second, and third cache lines, the first and second cache lines each containing a portion of a branch instruction and the third cache line containing a target instruction of the branch instruction, the branch control apparatus comprising:
- an instruction buffer, comprising first, second, and third stages for buffering the first, second, and third cache lines received from the instruction cache,;
- a branch target address cache (BTAC), coupled to said instruction buffer, for outputting an indication that said third cache line was selected from said instruction cache by a target address of said branch instruction provided by said BTAC; and
- a multiplexer, coupled between said instruction buffer and instruction format logic, configured to provide the first cache line and a portion of the second cache line from said first and second stages, respectively, to said instruction format logic to enable said instruction format logic to determine a length of the branch instruction, said multiplexer further configured to subsequently provide said third cache line from said third stage to said instruction format logic in response to said indication that said third cache line was selected from said instruction cache by said target address provided by said BTAC and in response to said length indicating the first and second cache lines each contain a portion of the branch instruction, wherein said second and third cache lines are non-sequential in memory address.

28. The branch control apparatus of claim 27, further comprising:
- a pointer into said first stage, for specifying a starting location of said branch instruction within said first stage.

29. The branch control apparatus of claim 28, further comprising:
- an adder, for generating a sum of said pointer and said length of said branch instruction;
- wherein said sum indicates that said first and second cache lines each contain a portion of said branch instruction.

30. The branch control apparatus of claim 29, wherein said multiplexer selects said third cache line based on said sum of said pointer and said length of said branch instruction and said indication output by said BTAC.

31. The branch control apparatus of claim 29, further comprising:
- a second multiplexer, coupled to said pointer, for selecting one of said sum and a portion of said target address as a next one of said pointer.

32. A method for buffering instruction bytes for provision to instruction format logic in a microprocessor, the microprocessor fetching a first cache line from an instruction cache for storing in an instruction buffer, the microprocessor having a branch predictor for providing a prediction of whether a predicted taken branch instruction is present in the first cache line and whether the branch instruction wraps across cache lines, the branch predictor also providing a target address of the branch instruction, wherein if the branch predictor predicts a wrapping taken branch instruction the microprocessor fetches as a second cache line a next cache line sequential to the first cache line and subsequently fetches a third cache line at the target address for storing in the instruction buffer, wherein if the branch predictor predicts a non-wrapping taken branch instruction the microprocessor fetches as the second cache line a cache line at the target address for storing in the instruction buffer, wherein otherwise the microprocessor fetches as the second cache line the next cache line sequential to the first cache line, the method comprising:
- storing an indication of whether the microprocessor fetched the cache line at the target address for storing in the instruction buffer;
- examining the first cache line stored in the instruction buffer and determining a length of a first instruction stored therein after said storing the indication;
- determining whether said first instruction wraps across the first and second cache lines in response to said determining the length of the first instruction; and
- selecting a next cache line stored in the instruction buffer for examining and determining a length of a next instruction in response to said determining whether the first instruction wraps across the first and second cache lines and in response to said indication of whether the microprocessor fetched the cache line at the target address for storing in the instruction buffer.

33. The method of claim 32, wherein said selecting a next cache line comprises selecting the third cache line if the first instruction wraps across the first and second cache lines and if said indication indicates the microprocessor fetched the cache line at the target address for storing in the instruction buffer.

34. The method of claim 33, further comprising:
shifting said first and second cache lines out of said instruction buffer, after said selecting.

35. The method of claim 32, wherein said selecting a next cache line comprises selecting the second cache line if the first instruction does not wrap across the first and second cache lines and if said indication indicates the microprocessor fetched the cache line at the target address for storing in the instruction buffer.

36. The method of claim 35, further comprising:
shifting said first cache line out of said instruction buffer, after said selecting.

37. The method of claim 32, further comprising:
determining whether a byte in said first instruction occupies a last byte of said first cache line in said instruction buffer.

38. The method of claim 37, wherein said selecting a next cache line comprises selecting the second cache line if said indication indicates the microprocessor did not fetch the cache line at the target address for storing in the instruction buffer and a byte in said first instruction occupies a last byte of said first cache line.

39. The method of claim 38, further comprising:
shifting said first cache line out of said instruction buffer, after said selecting.

40. The method of claim 37, wherein said selecting a next cache line comprises selecting the first cache line if said indication indicates the microprocessor did not fetch the cache line at the target address for storing in the instruction buffer and a byte in said first instruction does not occupy a last byte of said first cache line.

41. The method of claim 40, further comprising:
shifting no cache lines out of said instruction buffer, after said selecting.

* * * * *

UNITED STATES PATENT AND TRADEMARK OFFICE
CERTIFICATE OF CORRECTION

PATENT NO.         : 7,159,098 B2                                     Page 1 of 1
APPLICATION NO. : 10/920120
DATED              : January 2, 2007
INVENTOR(S)        : G. Glenn Henry and Thomas C. McDonald It is certified that error appears in the above-identified patent and that said Letters Patent is hereby corrected as shown below:

The table at column 1, lines 21-33 should be deleted.

Signed and Sealed this

Twenty-seventh Day of February, 2007

JON W. DUDAS
*Director of the United States Patent and Trademark Office*